US007680332B2

(12) United States Patent
Ye et al.

(10) Patent No.: US 7,680,332 B2
(45) Date of Patent: Mar. 16, 2010

(54) GROUPING LINES IN FREEFORM HANDWRITTEN TEXT

(75) Inventors: Ming Ye, Redmond, WA (US); Herry Sutanto, Redmond, WA (US); Sashi Raghupathy, Redmond, WA (US); Chengyang Li, Redmond, WA (US); Michael Shilman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 676 days.

(21) Appl. No.: 11/141,682

(22) Filed: May 30, 2005

(65) Prior Publication Data

US 2006/0271580 A1 Nov. 30, 2006

(51) Int. Cl.
G06K 9/00 (2006.01)

(52) U.S. Cl. .................. 382/187; 382/186; 704/232
(58) Field of Classification Search .............. 382/187, 382/186; 704/232; 707/101
See application file for complete search history.

(56) References Cited

U.S. PATENT DOCUMENTS

| 4,731,857 | A  | * | 3/1988  | Tappert .................. 382/178 |
| 5,768,423 | A  |   | 6/1998  | Aref et al. |
| 6,018,591 | A  |   | 1/2000  | Hull et al. |
| 6,393,395 | B1 |   | 5/2002  | Guha et al. |
| 2003/0210817 | A1 | * | 11/2003 | Hullender et al. ........... 382/187 |
| 2003/0215145 | A1 | * | 11/2003 | Shilman et al. ............. 382/195 |
| 2004/0001627 | A1 | * | 1/2004  | Simmons et al. ............ 382/186 |
| 2005/0044295 | A1 | * | 2/2005  | Wakeam et al. ............. 710/72 |
| 2005/0053283 | A1 | * | 3/2005  | Wakeam et al. ............. 382/186 |
| 2005/0100218 | A1 | * | 5/2005  | Guha .................. 382/187 |
| 2005/0135678 | A1 | * | 6/2005  | Wecker et al. ............. 382/186 |
| 2005/0175245 | A1 | * | 8/2005  | Sutanto et al. ............. 382/229 |
| 2006/0034516 | A1 | * | 2/2006  | Hullender et al. ........... 382/186 |
| 2006/0257025 | A1 | * | 11/2006 | Simmons et al. ............ 382/186 |
| 2007/0097102 | A1 | * | 5/2007  | Keely et al. .............. 345/179 |

OTHER PUBLICATIONS

International Search Report dtd Jul. 10, 2007, PCT/US06/20735.

* cited by examiner

*Primary Examiner*—Daniel G Mariam
*Assistant Examiner*—Aklilu k Woldemariam
(74) *Attorney, Agent, or Firm*—Shook, Hardy & Bacon L.L.P.

(57) ABSTRACT

Techniques for efficiently and accurately organizing freeform handwriting into lines. A global cost function is employed to find the simplest partitioning of electronic ink strokes into line groups that also maximize the "goodness" of the resulting lines and the consistency of their configuration. The "goodness" of a line may be based upon its linear regression error and the horizontal and vertical compactness of the strokes making up the line. The line consistency configuration for a grouping of strokes is measured by the angle difference between neighboring groups. The global cost function also takes into account the complexity of the stroke partitioning, measured by the number of lines into which the strokes are grouped. An initial grouping of strokes is made, and the cost for this initial grouping is determined. Alternate groupings of the initial stroke grouping are then generated. The global cost of each of these alternate stroke groupings is then calculated, and the stroke grouping that produces the largest global cost decrease from the global cost of the original grouping is selected. The alternate grouping creation, cost determination and evaluation, and grouping selection process then is repeated until the global cost for new grouping alternates no longer decreases.

20 Claims, 8 Drawing Sheets

GROUPING LINES IN FREEFORM HANDWRITTEN TEXT

FIELD OF THE INVENTION

The present invention relates to the organization of freeform handwriting in electronic ink. Various aspects of the present invention are particularly applicable to organizing freeform electronic ink handwriting into lines.

BACKGROUND OF THE INVENTION

Computers are regularly being used for a variety of purposes throughout the world. As computers have become commonplace, computer manufacturers have continuously sought to make them more accessible and user-friendly. One such effort has been the development of natural input methods, such as submitting data through handwriting. By writing with a stylus or another object onto a digitizer to produce "electronic ink," a computer user can forego the bulk and inconvenience associated with a keyboard. Handwriting input conveniently may be used, for example, by doctors making rounds, architects on a building site, couriers delivering packages, warehouse workers walking around a warehouse, and in any situation when the use of a keyboard would be awkward or inconvenient. The use of handwriting input is particularly useful when the use of a keyboard and mouse would be inconvenient or inappropriate, such as when the writer is moving, in a quite meeting, or the like. The use of handwriting input also is the natural choice for creating some types of data, such as mathematical formulas, charts, drawings, and annotations.

While handwriting input is more convenient than keyboard input in many situations, text written in electronic ink typically cannot be directly manipulated by most software applications. Instead, text written in electronic ink must be analyzed to convert it into another form, such as ASCII characters. This analysis includes a handwriting recognition process, which recognizes characters based upon various relationships between individual electronic ink strokes making up a word of electronic ink. Handwriting recognition algorithms have improved dramatically in recent years, but their accuracy can be reduced when electronic ink is written at an angle. Likewise, when separate groups of ink strokes cannot be easily distinguished, such as when two words are written closely together, many recognition algorithms cannot accurately recognize electronic ink. Some recognition algorithms also may incorrectly recognize electronic ink as text when, in fact, the electronic ink is intended to be a drawing.

The accuracy of many recognition algorithms can be greatly improved by "parsing" (e.g., by analyzing the layout of and/or "classifying") the electronic ink before using the handwriting recognition algorithm. A classification process typically determines whether an electronic ink stroke is part of a drawing (that is, a drawing ink stroke) or part of handwritten text (that is, a text ink stroke). Classification algorithms for identifying other stroke types also are possible. The layout analysis process typically groups electronic ink strokes into meaningful associations, such as words, lines and paragraphs.

Figure 1A:
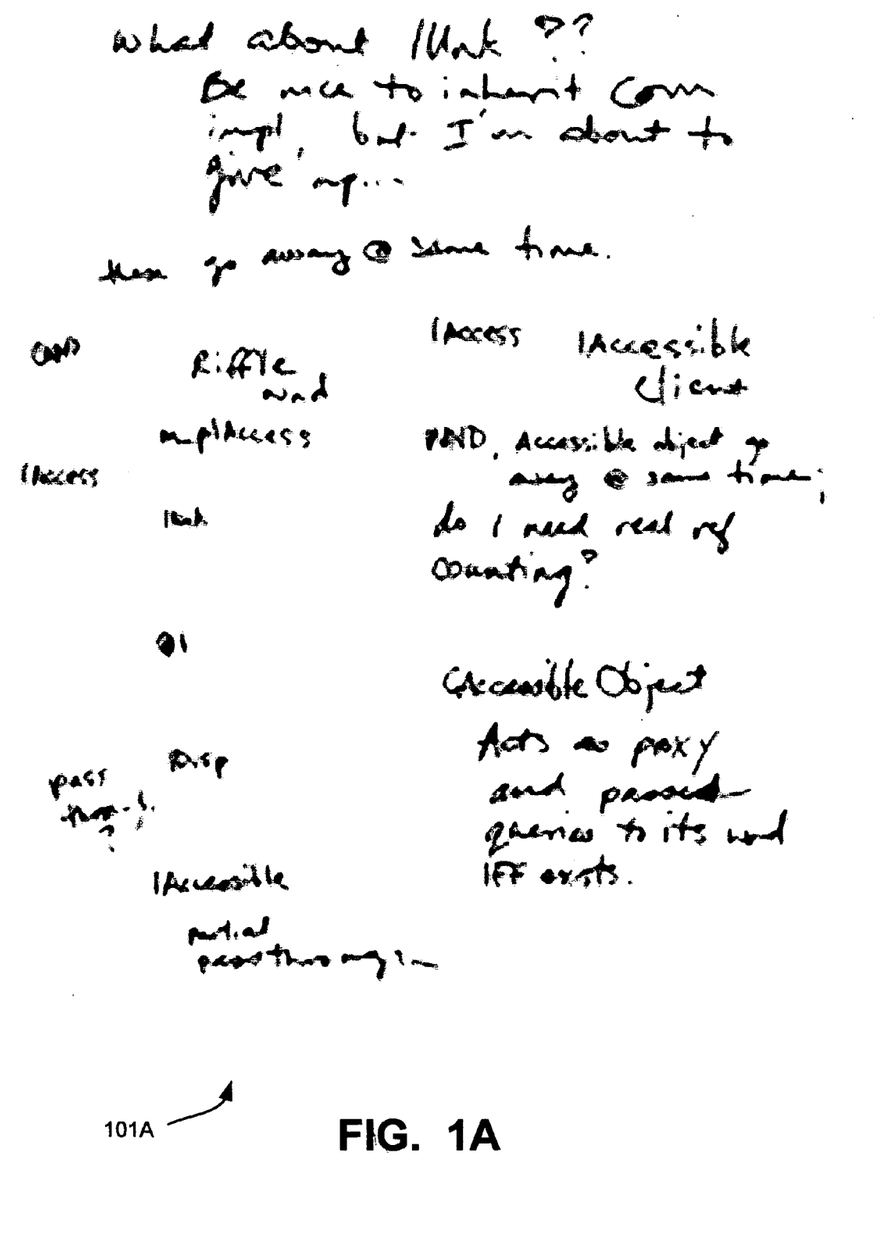
FIG. 1A illustrates an example of the possible complexity of freeform handwriting.

Text lines are the most salient structures in freeform handwriting, and their reliable detection is the foundation to higher level layout analysis and semantic parsing. Freeform ink notes are a mixture of complex structures such as blocks of text, drawings, charts and annotations, and the combination of different structures often makes it difficult to reliably identify discrete lines of text in freeform handwriting. For example, FIG. 1A illustrates an example of the potential complexity of freeform handwriting 101A.

Figure 1B:
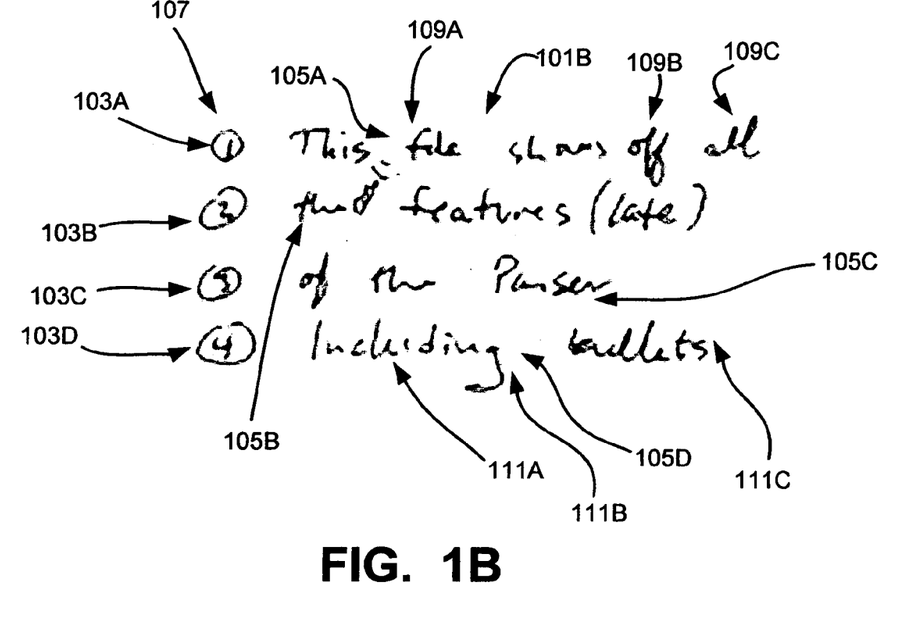

FIG. 1B illustrates just one example of the difficulty in grouping electronic ink strokes of handwritten text into lines. The handwriting 101B includes bullets 103A-103D and four groups of handwritten text 105A-105D. As will be noted by a human observer, the bullet 103A corresponds to the group of text 105A, the bullet 103B corresponds to the group of text 105B, the bullet 103C corresponds to the group of text 105C, and the bullet 103D corresponds to the group of text 105D. A human observer would also recognize that each of the groups 105A-105D should be treated as a single line of text.

The handwriting 101 may be incorrectly organized by a existing handwriting parsing technique. For example, as seen in this figure, bullets 103A-103D have erroneously been organized into a single vertical line. Also, the group of text 105A has been organized into three separate lines 109A-109C. Similarly, the group of text 105D has been organized into three separate lines 111A-111C. This erroneous recognition of the handwriting organization may make it particularly difficult for a handwriting recognition engine to correctly recognize, for example, the bullets 103A-103D.

In addition to handwriting recognition, parsing functions can be used to select handwriting text for editing and other manipulation. Accordingly, the erroneous organization of the handwriting may cause the incorrect handwriting to be selected and manipulated in a grouping that is inconvenient or even detrimental for a user.

BRIEF SUMMARY OF THE INVENTION

Advantageously, various aspects of the invention relate to techniques for efficiently and accurately organizing freeform handwriting into lines. Various examples of the invention employ global cost function designed to find the simplest partitioning of electronic ink stroke into line groups that also maximize the "goodness" of the resulting lines and the consistency of their configuration. Some embodiments of the invention measure the "goodness" of a line based upon its linear regression error and the horizontal and vertical compactness of the strokes making up the line. The line consistency configuration for a grouping of strokes is measured by the angle difference between neighboring groups. With various examples of the invention, the global cost function also takes into account the complexity of the stroke partitioning, measured by the number of lines into which the strokes are grouped.

An initial grouping of strokes is made, and the cost for this initial grouping is determined. With some examples of the invention, the strokes may initially be grouped using the one-dimensional array of strokes created based upon the temporal order in which the strokes were written. Various partitions of this array are created and the particular partition used for the initial grouping can be identified using a simplified version of the cost function by dynamic programming.

Alternate groupings of the initial stroke grouping are then generated. These grouping may be created, for example, by using grouping techniques that attempt to correct under and over grouping errors that may be included in the initial stroke grouping. The global cost of each of these alternate stroke groupings is then calculated, and the stroke grouping that produces the largest global cost decrease from the global cost of the original grouping is selected. The alternate grouping creation, cost determination and evaluation, and grouping selection process then is repeated until the global cost for new grouping alternates no longer decreases.

BRIEF DESCRIPTION OF THE DRAWINGS

1B illustrate an example of handwriting that has been organized into stroke groups to form lines.

DETAILED DESCRIPTION OF THE INVENTION

Overview

Various examples of the invention provide techniques for grouping strokes of electronic ink into lines. These techniques formulate line grouping as an optimal stroke partitioning problem. Thus, given a page of N strokes, the techniques determine the partitioning $\pi^*$ of the stroke set S among all possible partitions $\{\pi | \pi \in \Pi\}$ to optimize the goodness of the resulting lines and the consistency and simplicity of their configuration.

Various notations will be used herein to describe different aspects of the invention. These notations include:

s: a stroke, s∈S, represented by an array of sample points $p_i=(x_i, y_i)$, i=1, 2, ... $N_s$.

l: a hypothesized line group, made up of a set of strokes {s: s∈$S_l$}.

π: a hypothesized line partitioning into groups {l|π∈Π}, made up of a set of lines {l: l∈π} where $\forall_{(l,n):l,n\in\pi,l\neq n} S_l \cap S_n = \emptyset$ and $\cup_{l\in\pi} S_l = S$.

Implementation Environment

As will be appreciated by those of ordinary skill in the art, various examples of the invention may be implemented using analog circuitry. More commonly, however, embodiments of the invention will be implemented using a programmable computing device executing software instructions. Accordingly, one example of this type of implementation environment for various embodiments of the invention will now be described with regard to FIGS. 2 and 3.

Figure 2:
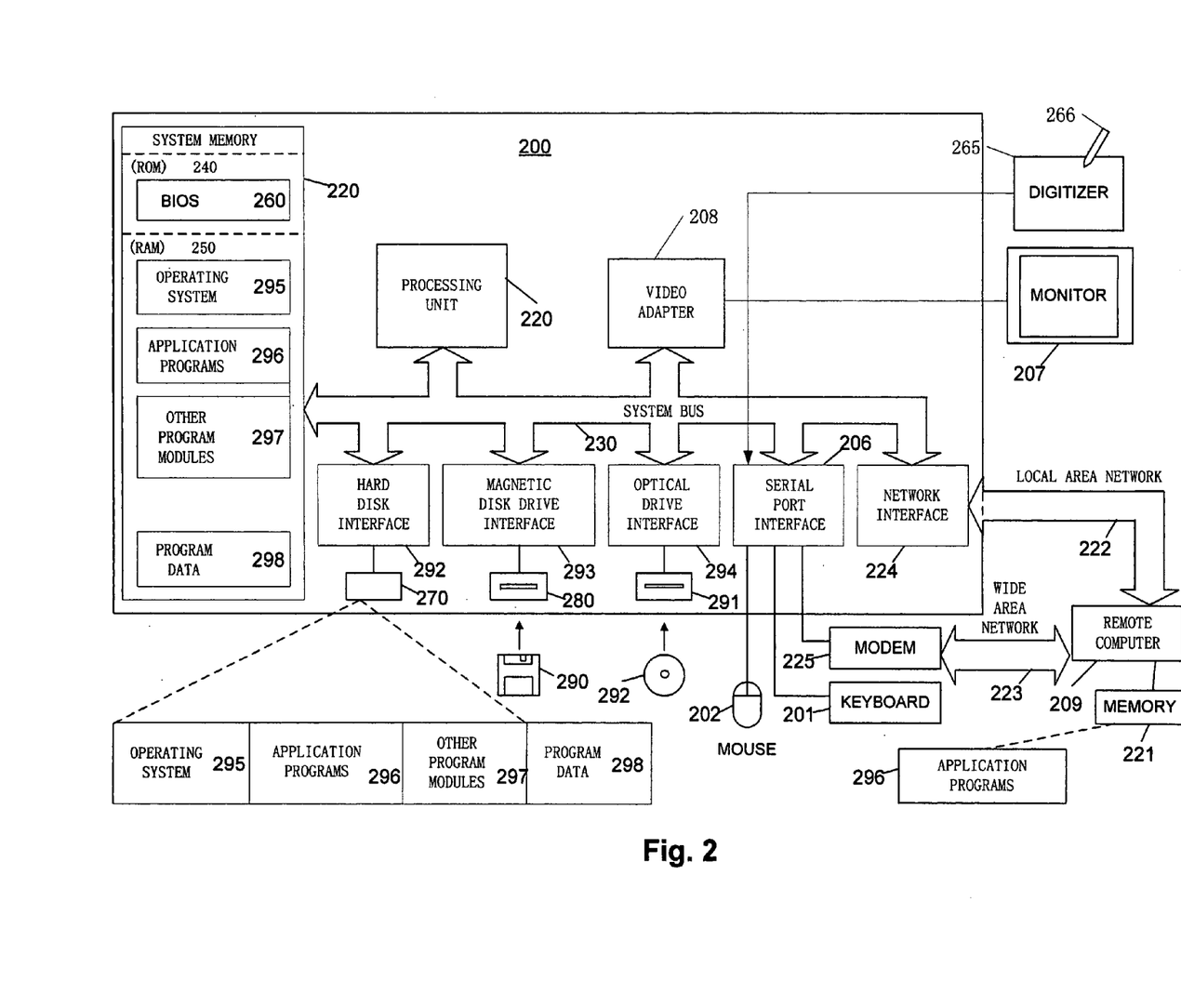
FIGS. 2 and 3 show examples of an operating environment that can be used to implement a data input panel having character conversion functionality according to various implementations of the invention.

FIG. 2 illustrates one example of a general-purpose digital computing environment that can be used to implement various embodiments of the invention. In particular, FIG. 2 shows a schematic diagram of a computer 200. The computer 200 typically includes at least some form of computer readable media. Computer readable media can be any available media that can be accessed by the computer 200. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, punched media, holographic storage, or any other medium which can be used to store the desired information and which can be accessed by the computer 200.

Communication media typically embodies computer readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As shown in FIG. 2, the computer 200 includes a processing unit 210, a system memory 220, and a system bus 230 that couples various system components including the system memory 220 to the processing unit 210. The system bus 230 may be any of several types of bus structures including a memory bus or memory controller, a peripheral bus, and a local bus using any of a variety of bus architectures. The system memory 220 may include read only memory (ROM) 240 and random access memory (RAM) 250.

A basic input/output system (BIOS) 260 contains the basic routines that help to transfer information between elements within the computer 200, such as during start-up, is stored in the ROM 240. The computer 200 also may include a hard disk drive 270 for reading from and writing to a hard disk (not shown), a magnetic disk drive 280 for reading from or writing to a removable magnetic disk 290, and an optical disk drive 291 for reading from or writing to a removable optical disk 292, such as a CD ROM, DVD ROM, or other optical media. The hard disk drive 270, magnetic disk drive 280, and optical disk drive 291 are connected to the system bus 230 by a hard disk drive interface 292, a magnetic disk drive interface 293, and an optical disk drive interface 294, respectively. These drives and their associated computer-readable media provide nonvolatile storage of computer-readable instructions, data structures, program modules, and other data for the personal computer 200. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 270, magnetic disk 290, optical disk 292, ROM 240, or RAM 250, including an operating system 295, one or more application programs 296, other program modules 297, and program data 298. A user can enter commands and information into the computer 200 through input devices, such as a keyboard 201 and pointing device 202 (such as a mouse). Other input devices (not shown) may include a microphone, joystick, game pad, satellite dish, scanner, or the like. These and other input devices are often connected to the processing unit 210 through a serial port interface 206 that is coupled to the system bus 230, but they also may be connected by other interfaces, such as a parallel port, game port, or a universal serial bus (USB), and the like. Further still, these devices may be coupled directly to the system bus 230 via an appropriate interface (not shown).

A monitor 207 or other type of display device also may be connected to the system bus 230 via an interface, such as a video adapter 208. In addition to the monitor 207, personal computers typically include other peripheral output devices (not shown), such as speakers and printers. In one example, a pen digitizer 265 and accompanying pen or stylus 266 are provided in order to digitally capture freehand input. Although a connection between the pen digitizer 265 and the serial port interface 206 is shown in FIG. 2, in practice, the pen digitizer 265 may be directly coupled to the processing unit 210, or it may be coupled to the processing unit 210 in any suitable manner, such as via a parallel port or another interface and the system bus 230 as is known in the art. Furthermore, although the digitizer 265 is shown separate from the monitor 207 in FIG. 2, the usable input area of the digitizer 265 may be co-extensive with the display area of the monitor 207. Further still, the digitizer 265 may be integrated in the monitor 207, or it may exist as a separate device overlaying or otherwise appended to the monitor 207.

The computer 200 can operate in a networked environment using logical connections to one or more remote computers, such as a remote computer 209. The remote computer 209 can be a server, a router, a network PC, a peer device or other common network node, and it typically includes many or all of the elements described above relative to the computer 200, although for simplicity, only a memory storage device 211 has been illustrated in FIG. 2. The logical connections depicted in FIG. 2 include a local area network (LAN) 212 and a wide area network (WAN) 213. Such networking environments are commonplace in offices, enterprise-wide computer networks, intranets, and the Internet, using both wired and wireless connections.

When used in a LAN networking environment, the computer 200 is connected to the local area network 212 through a network interface or adapter 214. When used in a WAN networking environment, the personal computer 200 typically includes a modem 215 or other means for establishing a communications link over the wide area network 213, such as the Internet. The modem 215, which may be internal or external to the computer 200, may be connected to the system bus 230 via the serial port interface 206. In a networked environment, program modules depicted relative to the personal computer 200, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP, UDP, and the like is presumed, and the system can be operated in a user-server configuration to permit a user to retrieve web pages from a web-based server. Any of various conventional web browsers can be used to display and manipulate data on web pages.

Although the FIG. 2 environment shows one example of an operating environment for various embodiments of the invention, it should be understood that other computing environments also may be used. For example, one or more examples of the present invention may use an environment having fewer than all of the various aspects shown in FIG. 2 and described above, and these aspects may appear in various combinations and subcombinations that will be apparent to one of ordinary skill.

Figure 3:
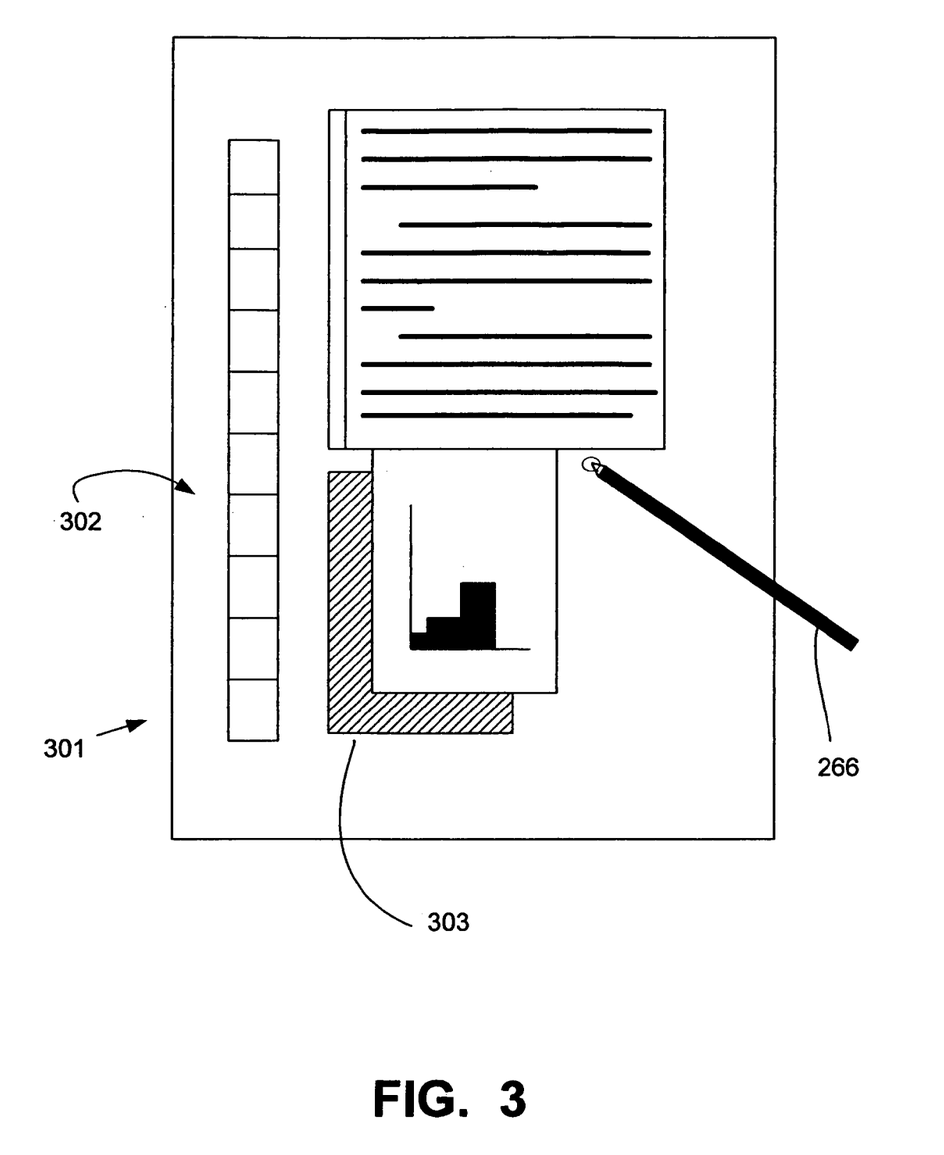

FIG. 3 illustrates a pen-based personal computer (PC) 301 that can be used in accordance with various aspects of the present invention. Any or all of the features, subsystems, and functions in the system of FIG. 2 can be included in the computer 301 of FIG. 3. The pen-based personal computer system 301 includes a large display surface 302, e.g., a digitizing flat panel display, such as a liquid crystal display (LCD) screen, on which a plurality of graphical user interfaces 303, such as windowed graphical user interfaces, is displayed. Using stylus 266, a user can select, highlight, and write on the digitizing display area. Examples of suitable digitizing display panels include electromagnetic pen digitizers, such as pen digitizers available from Mutoh Co. (now known as Fine-Point Innovations Co.) or Wacom Technology Co. Other types of pen digitizers, e.g., optical digitizers, and touch-sensitive digitizers may also be used. The pen-based computing system 301 interprets gestures made using stylus 266 in order to manipulate data, enter text, and execute conventional computer application tasks, such as creating, editing, and modifying spreadsheets, word processing programs, and the like.

The stylus 266 may be equipped with buttons or other features to augment its capabilities. In one example, a stylus 266 could be implemented as a "pencil" or "pen", in which one end constitutes a writing portion. The other end of the stylus 266 then constitutes an "eraser" end, which, when moved across the display, indicates portions of electronic ink on the display that are to be erased. Other types of input devices, such as a mouse, trackball, keyboard, or the like also could be used. Additionally, a user's own finger could be used for selecting or indicating portions of the displayed image if the display is a touch-sensitive or proximity-sensitive display. Consequently, the term "user input device," as used herein, is intended to have a broad definition and encompasses many variations on well-known input devices.

In addition to use with full performance pen-based computing systems or "tablet PCs" (e.g., convertible laptops or "slate" type tablet PCs), aspects of this invention can be used in conjunction with other types of pen-based computing systems and/or other devices that accept data as electronic ink and/or accept electronic pen or stylus input, such as: handheld or palm-top computing systems; personal digital assistants; pocket personal computers; mobile and cellular telephones, pagers, and other communication devices; watches; appliances; and any other devices or systems that include a monitor or other display device and/or a digitizer that presents printed or graphical information to users and/or allows input using an electronic pen or stylus, or which can process electronic ink collected by another device (e.g., a conventional desktop computer that can process electronic ink collected by a tablet PC).

Tool for Handwriting Recognition

Figure 4:
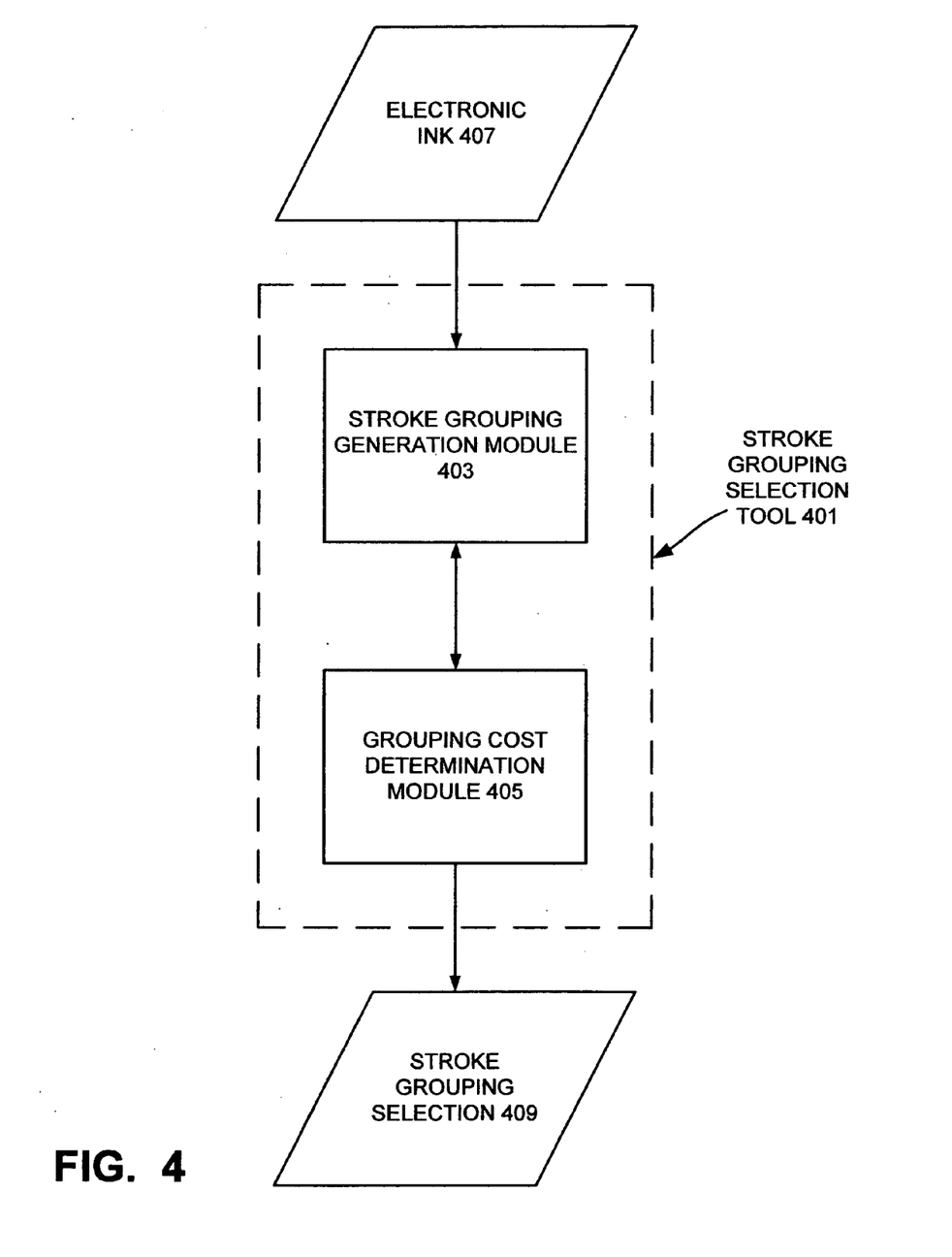
FIG. 4 illustrates one example of a handwriting organization tool according to various implementations of the invention.

FIG. 4 illustrates one example of a handwriting organization tool 401 that may be implemented according to various examples of the invention. This system may be implemented using, for example, the computer 100 illustrated in FIGS. 1 and 2. As seen in FIG. 4, the tool 401 has a stroke grouping generation module 403 and a grouping cost determination module 405. As will be explained in more detail below, the stroke grouping generation module 403 receives electronic ink 407. The relationship between the ink strokes will typically be represented using a data structure, such as tree structure. This data structure may, for example, provide both temporal and geometric information regarding each stroke. Also, strokes that are grouped into a line may, for example, be associated with a single node in the data structure or have some other association to indicate that relationship between the strokes. The stroke grouping generation module 403 organizes the ink 407 into an initial group of strokes, with each group being a line of handwritten text. The grouping generation module 403 then generates one or more alternate groupings of the strokes that are variations of the initial group of strokes.

The grouping cost determination module 405 then determines the cost of each stroke grouping created by the stroke grouping generation module 403. The grouping cost determination module 405 may calculate the cost for each stroke grouping using, for example, a global cost function, as will be explained in detail below. The grouping cost determination module 405 selects the alternate stroke grouping that provides the largest reduction in cost (if any), and provides the selected stroke grouping to the stroke grouping generation module 403. The stroke grouping generation module 403 then generates new alternate stroke groupings from the selected stroke grouping. The grouping cost determination module 405 then determines the cost for each of the new alternate groupings, and selects the new alternate stroke grouping that provides the largest reduction in cost (if any). The grouping cost determination module 405 then provides the new selected stroke grouping to the stroke grouping generation module 403. This process is repeated until the newest set of alternate stroke groupings does not reduce the cost from the currently selected stroke grouping. When this occurs, the currently selected stroke grouping is output as the stroke grouping selection 409.

Cost Determination

Figure 5:
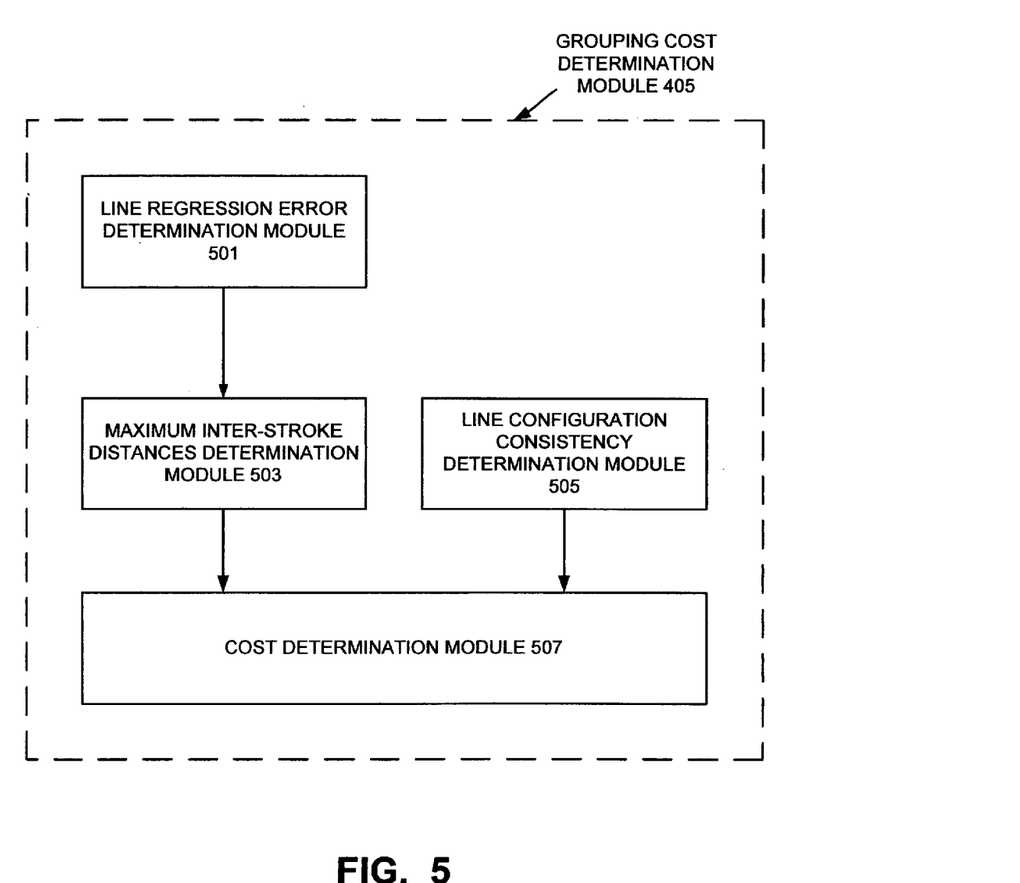
FIG. 5 illustrates a flow chart explaining the operation of a handwriting organization tool according to various implementations of the invention.

Referring now to FIG. 5, this figure illustrates one implementation of the grouping cost determination module 405 that may be employed according to various embodiments of the invention. As seen in this figure, the grouping cost determination module 405 includes a line regression error determination module 501, a maximum inter-stroke distances determination module 503, line configuration consistency determination module 505, and a cost determination module 507. As will be explained in more detail below, the cost determination module uses a cost function to determine a cost associated with a particular grouping of strokes into lines.

Various embodiments of the invention may use any desired cost function, but the illustrated embodiment employs a cost function that incorporates three "likelihood" terms. That is, these terms includes characteristics of a grouping of strokes prior characteristics reflecting the likelihood that the arrangement of groups is an accurate partitioning of the strokes into lines. The cost function also includes two "prior" terms, reflecting prior knowledge regarding line partitioning in freeform handwritten text. More particularly, the illustrated example of the cost determination module 405 employs a linear regression error and the maximum vertical and horizontal inter-stroke difference for each group of strokes as "likelihood" terms. It then employs line configuration consistency between the groups and the complexity of the grouping as "prior" terms.

For each group of strokes, the line regression error determination module 501 determines a linear regression error $e_{LR}$ by measuring the deviations of the points making up the strokes in the group from a fitting line. In the illustrated embodiment, for example, the line regression error determination module 501 uses the Total Least Squares technique to determine the goodness of a line. With the Total Least Squares linear regression technique, given the set of stroke points in a line l, the linear Total Least Squares linear regression technique finds the parameters $(a_l, b_l)$ to minimize the sum of the squared fitting error:

$$e_{LR}(l) = \sum_{s \in S_l} \sum_{i=1}^{N_s} \frac{(y_i - a_l x_i - b_l)^2}{1 + a_l^2}$$

where $e_{LR}$ measure the deviations of the point from the fitting line and reflects the linearity of the stroke set. The line segment defined by the linear regression technique and the point boundaries as l.

Figure 6:
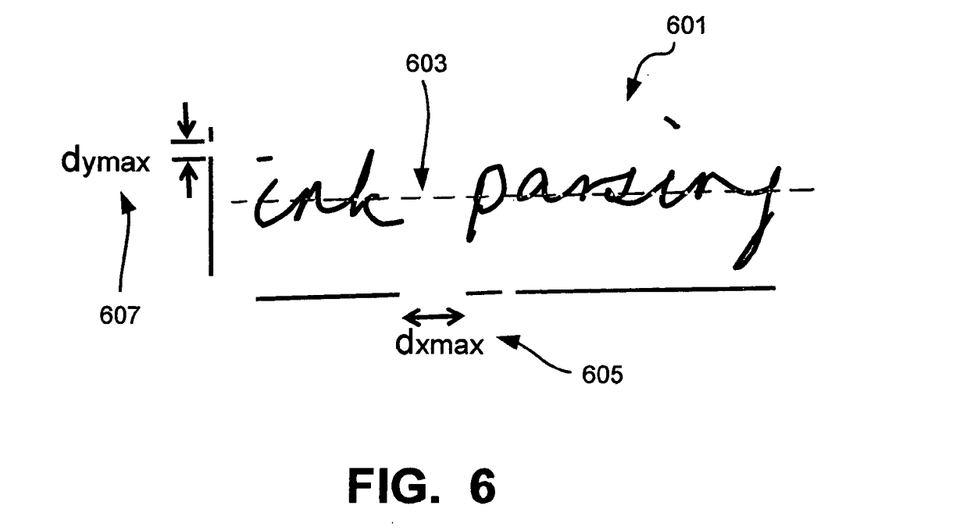
FIG. 6 illustrates the fitting line and the maximum inter-stroke distances $d_{xmax}(l)$ and $d_{ymax}(l)$ determined for a group of ink strokes using a linear regression technique according to various embodiments of the invention.

For example, FIG. 6 illustrates a group 601 of ink strokes. Using a linear regression technique, the line regression error determination module 501 generates a fitting line l 603 that best fits the overall linear direction of the strokes in the group. The line regression error determination module 501 also determines a linear regression error $e_{LR}$ that reflects the linearity of the stroke set. Of course, various embodiments of the invention may alternately use any other desired linear regression technique, such as the Least Squares regression technique. As will be appreciated by those of ordinary skill in the art, various alternate regression techniques may be more robust at handling outlier strokes. These techniques are well known in the art, and thus will not be discussed here in further detail.

Using the fitting line 603, the maximum inter-stroke distances determination module 503 determines the maximum inter-stroke distances $d_{xmax}(l)$ and $d_{ymax}(l)$. As shown in FIG. 6, the maximum inter-stroke distance $d_{xmax}(l)$ 605 is the maximum inter-stroke distance projected onto the fitting line 601. The maximum inter-stroke distance $d_{ymax}(l)$ 607 is then the maximum inter-stroke distance in the direction orthogonal to the fitting line 601. These maximum inter-stroke distances reflect the horizontal and vertical compactness of the stroke set.

For each group of strokes, the line configuration consistency determination module 505 determines the group's configuration consistency $\theta(l)$, which reflect the piecewise-smooth constraints of the stroke grouping. More particularly, the configuration consistency $\theta(l)$ of each group is calculated as the neighbor-length-weighted sum of the orientation angle differences between the group and each of neighbors, i.e., $$\theta(l) = \sum_{n \in N_l} |\hat{n}| \rho(\alpha_n - \alpha_l, \sigma)$$

where $\alpha_l$ is the orientation angle of the line segment l determined from the fitting parameters $(a_l, b_l)$. $|l|$ is the length of the segment, often indicating the relative confidence of the line l. Thus, weights can be used to encourage a line group to be more consistent with it more reliable neighbors. In the above equation, $\rho(r, \sigma)$ is a function regulating the influence of the residual r. In the illustrated example, $\rho(r, \sigma) = |r|$.

The global consistency of a particular partitioning or arrangement of groups $\pi$ can then be determined as the sum of all of the line consistencies as:

$$\theta_\pi = \Sigma_{l \in \pi} \theta(l)$$

For still other embodiments of the invention, more robust functions, such as, for example, the Geman-McClure function: rho(r, sigma)=r-squared/(r-squared+sigma-squared), can be adopted to regulate the angle difference to reduce oversmoothing, where neighboring line groups have very different orientation (e.g., such as might occur between main text and annotation text).

Figure 7:
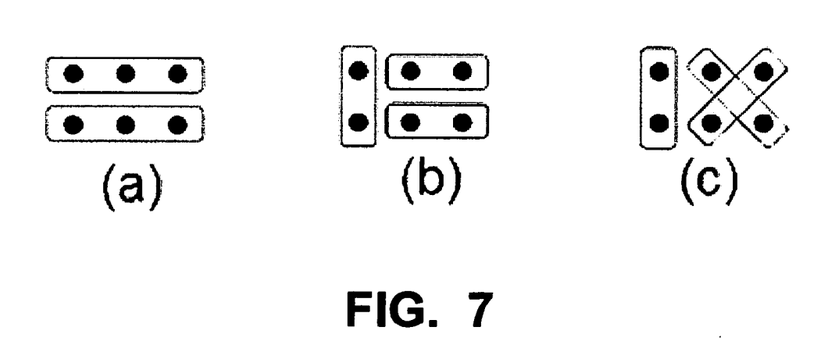
FIGS. 7A-7C graphically illustrate variations in line consistency between different groupings of handwritten text.

FIGS. 7A-7C graphically illustrate variations in line consistency between different groupings of handwritten text. The line consistency decreases from the line grouping shown in FIG. 7A to the line grouping shown in FIG. 7C as the line configuration consistency decreases.

To measure the consistency of a line configuration, the line configuration consistency determination module 505 creates a neighborhood graph. In this graph, each vertex corresponds to a group of strokes forming a line. The edges of the graph then correspond to neighbor relationships between the line groups. With various examples of the invention, a pair of line groups are considered neighbors if the minimum distance between their fitting line segments 601 falls below a threshold and there are no other objects (lines or drawings) lying between them. Still other embodiments of the invention may determine groups of strokes are neighbors if they are direct neighbors (i.e., with no other objects in between), or within certain Euclidian distances, or combinations of two or more different criteria.

Figure 8:
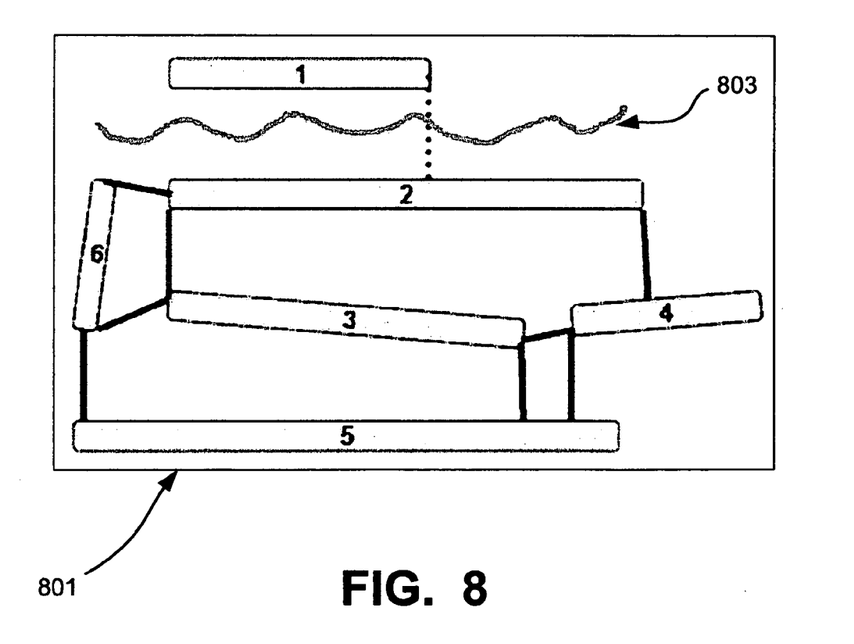
FIG. 8 illustrates an example of neighborhood graph of six line groups.

FIG. 8 illustrates an example of neighborhood graph 801 of six line groups. Each line group is represented by a gray bar and each edge represented by a solid black line. As shown in this figure, the edge (dotted line) between line group 1 and the line group 2 is rejected because there is a drawing stroke 803 (i.e. a curvy line) between them.

With various examples of the invention, the global consistency of a particular partitioning or arrangement of groups $\pi$ can alternately be expressed as $$\theta_\pi = \sum_{l \in \pi} \sum_{n \in N_l} |\hat{n}| \rho(\alpha_n - \alpha_l, \sigma)$$

$$= \sum_{e \in E} (|\hat{l}_{e1}| + |\hat{l}_{e2}|) * \rho(\alpha_{l_{e1}} - \alpha_{l_{e2}}, \sigma)$$

where e denotes an edge in the neighborhood graph G, and $l_{e1}$, $l_{e2}$ denote the two nodes that e connects. Instead of summing over all nodes in the graph, this expression sums over all edges.

In the illustrated embodiment, the cost determination module 507 calculates a cost associated for a partitioning of ink into line groups using the weighted sum of the linear regression error $e_{LR}$, the maximum inter-stroke distances $d_{xmax}(l)$ and $d_{ymax}(l)$, and the configuration consistency $\theta$ (l) of each group, taking into account the complexity of the grouping. The complexity $\pi$ of a handwritten ink is the number of line groups into which the ink has been partitioned. Thus, the illustrated example of the cost determination module 507 determines the cost of a stroke grouping as:

$$e_\pi = \sum_{l \in \pi} e_{LR}(l) + w_1 d_{xmax}^2(l) + w_2 d_{ymax}^2(l) + w_3 \theta(l) + w_4 \cdot 1,$$

where $w_i$ are parameters of the formulation controlling the relative importance of the terms. With various examples of the invention, $w_1=1$, $w_2=1$, $w_3=10000$, and $w_4=100$, but these values may be changed according to training/tuning of the tool. As will be explained in more detail below, the optimal grouping of strokes is the one that minimizes the cost obtained using this function.

Generating Stroke Groupings

As noted above, the stroke grouping generation module 403 generates an initial or baseline grouping of strokes. With some examples of the invention, this initial grouping of strokes is obtained by partitioning the one dimensional array of temporally ordered strokes into alternate arrangements of groups to form lines. Each alternate group arrangement then can be analyzed using a cost function. The stroke grouping generation module 403 may, for example, use a cost function that employs a subset of the terms in the global cost function used by the cost determination module 507 described in detail above. For example, the stroke grouping generation module 403 may use the function $$e_\pi = \sum_{l \in \pi} e_{LR}(l) + w_1 d_{xmax}^2(l) + w_2 \cdot 1,$$

where $d_{xmax}(l)$ is the maximum inter stroke distance projected on to the fitting line 601. Such a simplification is enabled by the dramatic reduction of the search space, and it also gives the cost function a recursive structure so that dynamic programming can apply. As a practical speedup, the stroke sequence can be divided into spans based on stroke proximity and size similarity, and perform partitioning only within each span.

Once the initial stroke grouping has been determined, the stroke grouping generation module 403 then generates alternate groupings of the strokes based upon the original stroke grouping using, for example, gradient-descent approach. For example, various implementations of the invention may generate two types of alternative groupings. The first type of alternate grouping is obtained by merging pairs of line groups that are neighbors in the neighborhood graph, discussed above. This type of alternate grouping tends to correct under-grouping errors that are typical in temporal grouping results. Under grouping errors may be caused by, for example, late 'i' dots and 't' crosses. The stroke grouping generation module 403 generates a merging hypothesis alternate stroke grouping for each neighboring pair in the initial stroke grouping.

The second type of alternate grouping is formed by attempting to correct any high configuration energy errors in the initial stroke grouping. High configuration energy errors are caused by temporally adjacent strokes belonging to different lines. These errors are frequently caused by, for example, bullets written before or after the list content is filled. Thus, any set of neighboring line groups where one of the groups (e.g., group "X") has a maximum angle difference from its neighbors which exceeds a threshold value (e.g., 30°) is an initial candidate. That is, the stroke grouping generation module 403 identifies those neighbor groups of group X that are approximately parallel to each other, but which have substantial angle differences with the group X. The stroke grouping generation module 403 then uses these neighbor groups as bins to split the strokes in Group X.

Some examples of the invention may alternately or additionally create alternate groupings of a third type to separate alternate groupings of a third type to separate y-outliers. With these alternates, in a group of strokes forming a line segment l, with a nonzero $d_{ymax}$ value, the strokes are split at the maximum y-gap. If the smaller stroke set $l_0$ is much closer to a neighbor group n than to its current line group l, then the smaller stroke set $l_0$ is merged with the neighbor group n.

Determining Cost Changes

Figure 9:
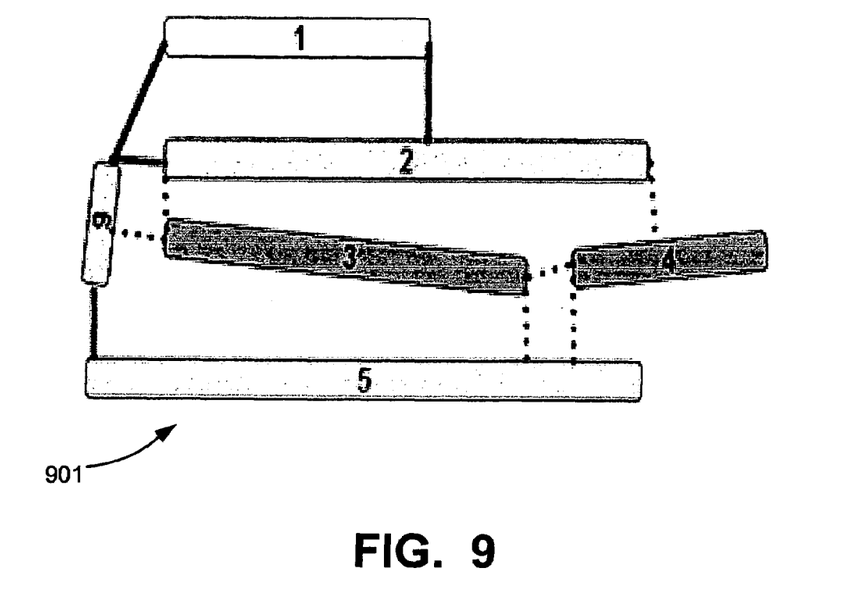
FIGS. 9 and 10 illustrate examples of neighborhood graphs of six line groups representing alternate stroke groupings.
Figure 10:
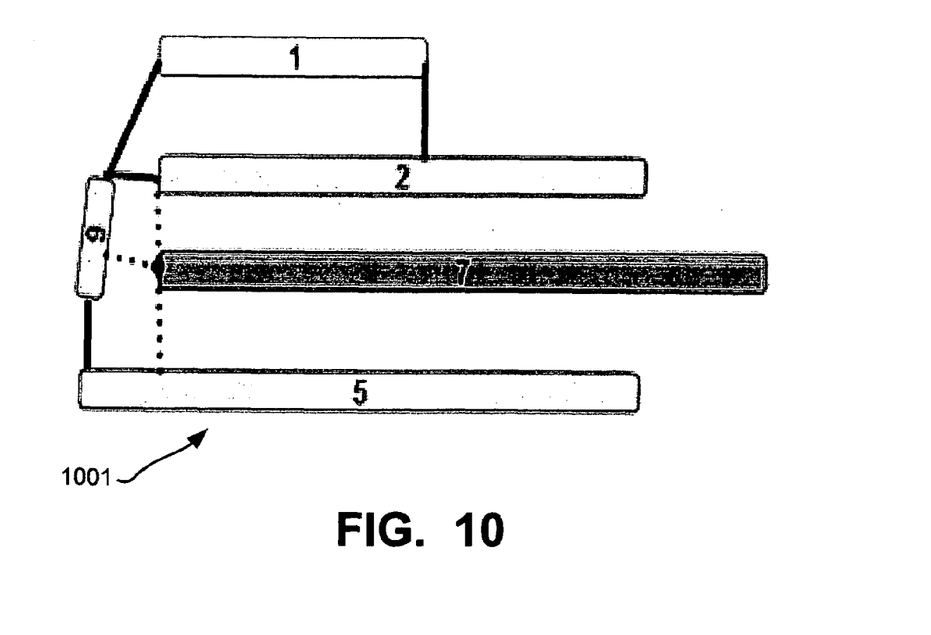

As discussed above, each alternate stroke grouping changes an existing stroke grouping $\pi_0$ to an alternative stroke grouping $\pi_1$ by re-grouping strokes in a local neighborhood. As illustrated in FIGS. 9 and 10, the stroke grouping $\pi_0$ (901)

differs from the stroke grouping $\pi_1$ (1001) only by the line groups colored in dark gray, which may be denoted as to $\{l^0\}$ and $\{l^1\}$ respectively. $\{l^0\}$ and $\{l^1\}$ have the same set of neighbor groups, which may be denoted as $N_{\{l\}}$, and are shown in light gray in FIGS. 9 an 10. The grouping of $N_{\{l\}}$ remain intact but their neighbor relationships have changed. Clearly, $\{l\}$ and $N_{\{l\}}$ are the only lines whose configuration are affected by the hypothesis. Therefore, the global cost change from $\pi_0$ to $\pi_1$ can be evaluated locally.

Given a selected stroke grouping $\pi_0^i$ at iteration i (which may be the initial stroke grouping or a subsequently selected stroke grouping), the stroke grouping generation module 403 generates a queue of alternative stroke groupings $\{\pi_j^i, j=1,2,\ldots\}$. Next, the grouping cost determination module 405 identifies accept the stroke grouping $\pi^{*i}$ that provides the largest global cost reduction. The stroke grouping generation module 403 then creates a new set of alternate stroke groupings accordingly, and this process is iterated until the queue is empty.

More particularly, given a selected stroke grouping $\pi_0^i$ at iteration i, the stroke grouping generation module 403 generates a queue of alternative stroke group arrangements $\{\pi_j^i, j=1,2,\ldots\}$. Next, the grouping cost determination module 405 identifies accept the stroke grouping $\pi_*^i$ that provides the largest global cost reduction. If this stroke grouping $\pi_*^i$ does not reduce the global cost relative to the global cost for $\pi_0^i$, then the process stops and the arrangement $\pi_0^i$ is selected as the line partitioning. If not, then the arrangement $\pi_*^i$ is accepted as the next iteration. The graph is updated by removing $\{l^0\}$ from the graph, together with all affected edges. The new line $\{l^*\}$ for the new alternate arrangement is created in the graph, together with the appropriate edges.

Next, the queue of alternate arrangements is then updated. This includes removing conflicting alternate arrangements. An arrangement of strokes into groups $\pi_j^i$ conflicts with $\pi_*^i$ if $l_j^0 \cap l_*^0 \neq \emptyset$. Then, the affected alternate arrangement is updated. An arrangement $\pi_j^i$ is affected by $\pi_*^i$ if its $N_{affected,j} \cap l_*^0 \neq \emptyset$. The configuration costs are then computed, and new alternate arrangements are generated. This becomes the next iteration, where $i \rightarrow i+1$.

Once the arrangement of line groups having the lowest cost function is determined, then the data structure reflecting the relationships between the strokes of electronic ink is updated to reflect this line grouping.

Incremental Stroke Organization

While the examples of the invention described above relate to a "batch" processing of electronic ink, it should be appreciated that these local gradient-descent optimization techniques also provide a good solution for incremental parsing of electronic ink. This use may be particularly beneficial for real-time ink analysis. Online ink data is usually generated incrementally. Each time that an ink parser is called, the input data may be a page of parsed results plus several new strokes. It is desirable to have some incremental mechanism to "massage" the new strokes into the existing page structure. The relaxation-like optimization algorithm described above performs this task naturally. With some implementations of the invention, this incremental operation may be much more efficient than the batch operations with consistent results.

Conclusion

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. One or more computer storage media having computer-readable instructions embodied thereon for performing a method of grouping electronic ink strokes into lines of handwritten text that utilizes a global cost function to calculate a cost of grouping strokes into lines, the method comprising the steps of:
   (a) receiving a plurality of electronic ink strokes;
   (b) partitioning the plurality of electronic ink strokes into an initial stroke grouping, the initial stroke grouping comprising an arrangement of one or more initial line groups of strokes, each of the one or more initial line groups of strokes comprising a line of handwritten text;
   (c) generating an alternate stroke grouping, the alternate stroke grouping comprising an alternate arrangement of one or more alternate line groups of strokes, each of the one or more alternate line groups of strokes comprising a line of handwritten text, wherein the alternate stroke grouping is a variation of the initial stroke grouping;
   (d) calculating, using a global cost function, a cost associated with the initial stroke grouping;
   (e) calculating, using the global cost function, a cost associated with the alternate stroke grouping; and
   (f) determining whether the cost associated with the alternate stroke grouping is less than the cost associated with the initial stroke grouping, wherein:
       (1) if the cost associated with the alternate stroke grouping is not less than the cost associated with the initial stroke grouping, the method further comprises outputting the initial stroke grouping to an application; and
       (2) if the cost associated with the alternate stroke grouping is less than the cost associated with the initial stroke grouping, the method further comprises repeating the steps of (c)-(f) wherein the alternate stroke grouping is substituted for the initial stroke grouping.

2. The media recited in claim 1, wherein generating the alternate stroke grouping comprises partitioning the plurality of electronic ink strokes into the alternate arrangement of groups by locally modifying the initial arrangement of groups using a gradient-descent local optimization technique.

3. The media recited in claim 1, wherein generating the alternate stroke grouping comprises partitioning the plurality of electronic ink strokes into the alternate arrangement of groups by locally modifying the initial arrangement of groups to merge adjacent pairs of groups.

4. The media recited in claim 1, wherein generating the alternate stroke grouping comprises partitioning the plurality of electronic ink strokes into the alternate arrangement of groups by locally modifying the initial arrangement of groups to correct potential bullet line errors.

5. The media recited in claim 1, wherein generating the alternate stroke grouping comprises partitioning the plurality of electronic ink strokes into the alternate arrangement of groups by locally modifying the initial arrangement of groups to separate vertical outliers.

6. The media recited in claim 1, wherein the global cost function comprises a plurality of likelihood terms, each of the plurality of likelihood terms including a characteristic that reflects a likelihood that a stroke grouping is an accurate partitioning of the plurality of electronic ink strokes into lines of handwritten text.

7. The media recited in claim 6, wherein the global cost function further comprises a term that reflects a line configuration consistency between stroke groupings.

8. The media recited in claim 7, wherein the global cost function further comprises a term that reflects a complexity of a stroke grouping.

9. The media recited in claim 6, wherein at least one of the plurality of likelihood terms comprises a linear regression error.

10. The media recited in claim 6, wherein at least one of the plurality of likelihood terms comprises a maximum vertical inter-stroke difference.

11. The media recited in claim 6, wherein at least one of the plurality of likelihood terms comprises a horizontal inter-stroke difference.

12. The media recited in claim 6, wherein global cost function comprises a weighted sum of a linear regression error, a maximum vertical inter-stroke distance, a maximum horizontal inter-stroke distance, and a configuration consistency.

13. The media recited in claim 6, wherein the alternate stroke grouping is generated based on a cost function that comprises a subset of the plurality of likelihood terms.

14. The media recited in claim 7, further comprising dividing the plurality of electronic ink strokes into spans and performing partitioning only within each span.

15. The media recited in claim 14, wherein said spans are based on at least one of stroke proximity and stroke size similarity.

16. The media recited in claim 1, wherein receiving the plurality of ink strokes comprises incrementally receiving online ink data, thereby allowing for incremental parsing of the electronic ink.

17. A computer system for processing handwriting input by organizing freeform handwriting received as strokes of electronic ink into lines of handwritten text, the computer system comprising:
- a processing unit that executes computer-readable instructions read from a computer-readable storage medium;
- a user input device that accepts data as electronic ink, wherein the user input device is connected to the processing unit through a system bus; and
- one or more computer-readable media readable by the processing unit and having computer-readable instructions stored thereon, the computer-readable instructions comprising:
  - a stroke grouping generation module that receives electronic ink from the input device, organizes the electronic ink into an initial grouping of strokes into lines, and generates a plurality of alternate groupings of strokes into lines, wherein each of the plurality of alternate groupings is a variation of the initial grouping; and
  - a grouping cost determination module that determines a cost of the initial grouping and of each of the plurality of alternative groupings using a global cost function, wherein:
    - if the cost of the initial grouping is not greater than the cost of any of the alternative groupings, the grouping cost determination module outputs the initial grouping as lines of handwritten text to an application; and
    - if the cost of the initial grouping is greater than at least one of the alternative groupings, the grouping cost determination module selects an alternative grouping having a lower cost than each of the other alternative groupings and provides the selected grouping to the stroke grouping generation module, which processes the selected grouping as a new initial grouping.

18. The system recited in claim 17, wherein the grouping cost determination module comprises:
- a line regression error determination module that determines a linear regression error value measuring a deviation from a fitting line of a set of stroke points in each of a plurality of electronic ink strokes in a grouping;
- a maximum inter-stroke distances determination module that determines a maximum horizontal inter-stroke distance for each line group, where the maximum horizontal inter-stroke distance is a maximum distance between two strokes in a line along a direction of the fitting line; and
- a line configuration consistency determination module that determines a configuration consistency of each line in a grouping.

19. One or more computer storage media having computer-readable instructions embodied thereon for performing a method of partitioning freeform handwriting input into lines of handwritten text, the method comprising:
- (a) receiving freeform handwriting input, the handwriting input comprising a plurality of electronic ink strokes;
- (b) partitioning the plurality of electronic ink strokes into an initial stroke grouping, the initial stroke grouping comprising an arrangement of a plurality of initial line groups of strokes, each of the plurality of initial line groups of strokes comprising a line of handwritten text;
- (c) generating a plurality of alternate stroke groupings, each of the plurality of alternate stroke groupings comprising an alternate arrangement of one or more alternate line groups of strokes, each of the one or more alternate line groups of strokes comprising a line of handwritten text, wherein each of the plurality of alternate stroke groupings is a variation of the initial stroke grouping;
- (d) calculating a cost associated with the initial stroke grouping using a global cost function comprising at least one likelihood term, the likelihood term comprising a characteristic of the initial stroke grouping that reflects a likelihood that the initial stroke grouping is an accurate partitioning of the plurality of strokes into lines of handwritten text;
- (e) calculating a cost associated with the alternate stroke grouping using the global cost function, the likelihood term comprising a characteristic of the alternate stroke grouping that reflects a likelihood that the alternate stroke grouping is an accurate partitioning of the plurality of strokes into lines of handwritten text; and
- (f) determining whether the cost associated with the alternate stroke grouping is less than the cost associated with the initial stroke grouping wherein:
  - (1) if the cost associated with the alternate stroke grouping is not less than the cost associated with the initial stroke grouping, the method further comprises outputting the initial stroke grouping to an application; and
  - (2) if the cost associated with the alternate stroke grouping is less than the cost associated with the initial stroke grouping, the method further comprises repeating the steps of (c)-(f) wherein the alternate stroke grouping is substituted for the initial stroke grouping.

20. The media of claim 19, wherein the global cost function further comprising a term that reflects a line configuration consistency between the initial grouping and the alternate grouping.

* * * * *